(12) United States Patent
Deutscher et al.

(10) Patent No.: US 8,636,003 B2
(45) Date of Patent: Jan. 28, 2014

(54) OXYGEN SUPPLY SYSTEM FOR GENERATING OXYGEN FROM CABIN AIR IN AN AIRCRAFT

(75) Inventors: Walter Deutscher, Dassendorf (DE);
Thomas Vogt, Hamburg (DE);
Robertino Kolarski, Dörverden (DE);
Dorothee Lang, Pinneberg (DE)

(73) Assignee: Airbus Operations GmbH, Hamburg (DE)

( * ) Notice: Subject to any disclaimer, the term of this patent is extended or adjusted under 35 U.S.C. 154(b) by 1206 days.

(21) Appl. No.: 12/326,815

(22) Filed: Dec. 2, 2008

(65) Prior Publication Data

US 2009/0139519 A1 Jun. 4, 2009

Related U.S. Application Data

(63) Continuation of application No. PCT/EP2007/004889, filed on Jun. 1, 2007.

(60) Provisional application No. 60/810,381, filed on Jun. 2, 2006, provisional application No. 60/822,959, filed on Aug. 21, 2006.

(30) Foreign Application Priority Data

Aug. 21, 2006 (DE) .......................... 10 2006 039 181

(51) Int. Cl.
*A61M 11/00* (2006.01)

(52) U.S. Cl.
USPC ...................... 128/204.18; 128/204.21; 95/96; 95/130; 55/357; 55/359; 244/118.5; 244/122 R

(58) Field of Classification Search
USPC ............. 128/201.21, 205.25, 205.11, 205.18, 128/202.26, 204.18, 204.21, 204.23; 95/96, 95/98, 102, 130, 26; 55/267, 357, 359; 244/118.5, 122 R See application file for complete search history.

(56) References Cited

U.S. PATENT DOCUMENTS

| 3,922,149 A | 11/1975 | Ruder et al. |
| 4,609,166 A | 9/1986 | Brennan |

(Continued)

FOREIGN PATENT DOCUMENTS

| DE | 2901938 A1 | 8/1979 |
| DE | 19534025 C1 | 11/1996 |

(Continued)

OTHER PUBLICATIONS

Chinese Office Action for Chinese Application No. 200780019496.5 mailed Dec. 15, 2010.

(Continued)

*Primary Examiner* — Steven Douglas
(74) *Attorney, Agent, or Firm* — Ingrassia Fisher & Lorenz, P.C.

(57) ABSTRACT

An oxygen supply system is provided for generating oxygen from cabin air in an aircraft. The oxygen supply system exhibits a modular cabin unit with an oxygen port and a decentralized oxygen supply unit with an oxygen outlet, and the decentralized oxygen supply unit is set up in the modular cabin unit. The decentralized oxygen supply unit is set up to generate oxygen-enriched air from the cabin air by means of electrical power, and the oxygen-enriched air can be provided to the oxygen port of the modular cabin unit via the oxygen outlet.

15 Claims, 6 Drawing Sheets

(56) References Cited

U.S. PATENT DOCUMENTS

| | | |
|---|---|---|
| 5,531,807 A | 7/1996 | McCombs |
| 5,795,018 A | 8/1998 | Schumacher et al. |
| 6,929,218 B1 | 8/2005 | Sanford et al. |
| 7,055,780 B2 | 6/2006 | Phillips |
| 7,431,032 B2 * | 10/2008 | Jagger et al. ............ 128/201.21 |
| 2002/0127442 A1 | 9/2002 | Connor et al. |
| 2005/0116101 A1 | 6/2005 | Pozzi et al. |
| 2005/0136299 A1 | 6/2005 | Richey, II et al. |
| 2006/0032979 A1 | 2/2006 | Mitchell et al. |
| 2006/0243859 A1 | 11/2006 | Lessi et al. |

FOREIGN PATENT DOCUMENTS

| | | |
|---|---|---|
| DE | 19531916 A1 | 3/1997 |
| EP | 1358911 A1 | 11/2003 |
| EP | 1598103 A2 | 11/2005 |
| JP | 1993208699 | 8/1993 |
| JP | 2004229883 A | 8/2004 |
| JP | 2004523327 A | 8/2004 |
| JP | 3106951 U | 11/2004 |
| JP | 2005139718 A | 6/2005 |
| JP | 2006122076 A | 5/2006 |
| RU | 44517 U1 | 3/2005 |
| RU | 2298422 C2 | 5/2007 |
| SU | 1235118 A1 | 12/1983 |
| WO | WO03068317 | 8/2003 |
| WO | 2005002966 A1 | 1/2005 |

OTHER PUBLICATIONS

Chinese Office Action for Application No. 200780019496.5 mailed Jul. 14, 2010.
Russian Notice of Allowance dated Jul. 15, 2011 for German Application No. 102006039181.0.

* cited by examiner

OXYGEN SUPPLY SYSTEM FOR GENERATING OXYGEN FROM CABIN AIR IN AN AIRCRAFT

CROSS-REFERENCE TO RELATED APPLICATIONS

This application is a continuation of International Application No. PCT/EP2007/004889, filed Jun. 1, 2007, which was published under PCT Article 21(2) and claims priority to German Patent Application No. 102006039181.0 filed Aug. 21, 2006, claims priority to U.S. Provisional Patent Application No. 60/822,959 filed Aug. 21, 2006, and claims priority to U.S. Provisional Patent Application No. 60/810,381 filed Jun. 2, 2006, the disclosures of which applications are hereby incorporated herein by reference.

TECHNICAL FIELD

This technical field relates to an oxygen supply system and a method for generating oxygen-enriched air from cabin air in an aircraft.

BACKGROUND

In commercial aircraft, safety requirements dictate that the passenger be provided with air containing sufficient oxygen given a pressure drop in the cabin.

Oxygen or oxygen-enriched air can be generated using chemical oxygen generating systems or gaseous oxygen systems, for example. When using chemical oxygen generating system, use is made of oxygen generating systems with sodium chlorate candles, for example, enabling the chemical generation of oxygen by burning down these sodium chlorate candles. Once the reaction has been started, it can most often not be terminated or interrupted, and the sodium chlorate candle burning time is limited to approximately 15 to 22 minutes. When using chemical gas reactors, the used chemicals (e.g., sodium chlorate candles), are be replaced after use or after approximately 15 years at the latest. In addition, chemical reactions are accompanied by high temperatures of approximately 260° C., making integration into cabin elements (e.g., into a passenger seating element) critical.

When using gaseous oxygen systems (e.g., an oxygen storage tank in an aircraft), the required oxygen is supplied to the passenger via intricate tubing systems subject to special protective measures. This necessitates a high installation outlay, along with complex tightness tests of the tubing system. This is necessary in particular since gaseous oxygen greatly facilitates the spread of fire, and is classified as a hazardous substance, so that strict rules in handling oxygen must be followed. Another side effect is that the used system elements (e.g., the oxygen reservoir or valve settings) must constantly be monitored. This oxygen reservoir must additionally always be carried along and maintained. In addition, the inflexible tubing system can make reconfiguring cabin elements complicated (e.g., shifting seating elements, since the oxygen distribution system must be adjusted). This results in difficulties in the providing oxygen in a cabin element (e.g., a seating element), since the pneumatic connection to the primary oxygen distribution system must be continuously adjusted.

Oxygen systems used in cabin elements (e.g., in a seating element), have to date been based on chemical oxygen generation. DE 4227377 shows a seat design for an airline passenger seat with a chemical oxygen generating system, and a container for generating oxygen is arranged in the seat floor under the seat floor cushion. The container generates oxygen via chemical reaction, and relays it to the oxygen masks via oxygen-carrying tubing. DE 195 34 025 describes supply units arranged in a laterally allocated column of a passenger seat.

In addition, an oxygen supply unit can be used to enrich breathable air with oxygen, which the cabin air uses for generating oxygen-enriched air. A molecular sieve that operates based on the so-called pressure-swing-absorption principle (PSA) can here be used, for example. EP 1 598 103 and AU 4366396 describe portable oxygen concentration systems, which generate oxygen according to the pressure-swing-absorption principle. DE 2901938 describes a flowing agent separating with a molecular sieve, with which an oxygen-enriched product can be generated from pressurized air. EP 135 89 11 describes a system for generating oxygen based on a molecular sieve principle on board an aircraft.

In view of the foregoing, it may be seen as a need to enable a flexible, modular cabin unit with an oxygen supply. In addition, other needs, desirable features, and characteristics will become apparent from the subsequent summary, detailed description, and the appended claims, taken in conjunction with the accompanying drawings and this background.

SUMMARY

In an exemplary embodiment of the invention, an oxygen supply system is provided for generating oxygen-enriched air from cabin air in an aircraft. The oxygen supply system exhibits a modular cabin unit with an oxygen port and decentralized oxygen supply unit with an oxygen outlet, and the decentralized oxygen supply unit is situated in the modular cabin unit. The oxygen generation device is here set up in such a way that electrical energy can be used to generate oxygen-enriched air from the cabin air, and the oxygen can be provided at the oxygen port of the modular cabin unit by means of the oxygen outlet.

Another exemplary embodiment of the invention provides a method for generating oxygen-enriched air from cabin air in an aircraft. A decentralized oxygen supply unit is set up in modular cabin unit. An oxygen generating device uses electrical energy to generate oxygen-enriched air from the cabin air. The oxygen-enriched air is provided by means of an oxygen outlet at an oxygen port of the modular cabin unit.

The term cabin air in particular relates to the surrounding air around the oxygen generating system, which in an emergency might be contaminated (e.g., contaminated by particles) or exhibit a low oxygen partial pressure (e.g., below approximately 210 mbar). The term oxygen-enriched air includes, for example, breathable air, and the oxygen content of the oxygen-enriched air can exhibit over about 21% oxygen, for example. In addition, the oxygen-enriched air can exhibit an oxygen content of up to approximately 95% or even approximately 100%. For example, if the cabin pressure drops in an aircraft, the oxygen partial pressure decreases. While the oxygen percentage remains identical, it can no longer be respired and processed by the lungs due to the low oxygen partial pressure. In order to compensate for this, the oxygen content in the breathable air is increased, so that the lung can take in more oxygen.

Generating oxygen with electrical energy means that oxygen is generated neither via chemical reactions nor via oxygen tanks. Oxygen can be generated via electrical energy using an electrolysis process or a molecular sieve with a pressure-swing-adsorption method (e.g., PSA-pressure swing adsorption and/or VSA-vacuum swing adsorption). In addition, electrical energy can also be used to operate an electrochemical membrane. The electrochemical membranes consist of zirconium membranes with properties that allow oxygen ions to pass through at a high temperature, but not other molecules or ions. The oxygen ions are here generated at a cathode from the air, and diffused through the electrochemical membrane by means of an electrical field. The oxygen ions again react to form oxygen molecules at an anode side, so that pure oxygen can be generated.

The electrically operatable decentralized oxygen supply unit of the oxygen supply system can be used to provide an unlimited emergency supply of oxygen for passengers. Since oxygen is generated via electrical energy, the oxygen supply system can operate for variable lengths of time, and hence be adjusted to the respective flight routes. In addition, the system can be operated repeatedly. Since no combustible catalysts or limited oxygen tanks are used, passengers can be given an unlimited supply in case of emergency.

In addition, the oxygen supply system eliminates the need for complex tubing systems in an aircraft. This reduces the space required for the oxygen supply system. In addition, there are no dependencies on other modular cabin units, so that all passenger seating elements can be supplied with oxygen-enriched air separately and apart from each other. For example, a cabin layout can be flexibly altered without requiring a complicated retrofitting of the oxygen supply system. Because the modular cabin unit is independent of other modular cabin units, no special solutions are required for oxygen supply, so that any layout desired can be selected for the modular cabin units. Therefore, the embodiments of the invention make it possible to manufacture nearly autonomous modular cabin units (e.g., passenger seating elements), which only require an electrical interface. This makes it possible to satisfy the high requirements of modern passenger aircraft in terms of flexibility, rapid reconfiguration and free layout selection. In addition to being used as an emergency oxygen supply system, the system can also be employed for therapeutic purposes in each seat without any additional outlay, so that passengers can be provided with oxygen-enriched air not just in emergencies, but for therapeutic purposes. In like manner, supply is also possible for purposes of first aid, and ill passengers can be supplied with a high percentage of oxygen. In addition, wellness offers can be made to passengers, in which they are provided with oxygen-enriched air. Further, oxygen can be supplied separately and independently for each modular cabin unit.

In addition, the oxygen supply system does not require any bleed-air supply from the propulsion systems, because the decentralized oxygen supply unit uses cabin air. The fact that the oxygen-enriched air is locally generated and need not be stored eliminates another potential hazard. Further, the system makes it possible to perform a self-test prior to each flight for each modular cabin unit. As a result, a complex monitoring system is not required. Also not necessary are expensive maintenance operations, such as those required based on mandatory pressure tests or refilling in the case of gas tanks. Since the decentralized oxygen supply unit is situated in a modular cabin unit, the accessibility is good, thereby facilitating maintenance or replacement. In addition, older aircraft can be retrofitted with the decentralized oxygen supply unit.

In another exemplary embodiment, the decentralized oxygen supply unit exhibits an air generator and oxygen generation device. The oxygen generation device exhibits a molecular sieve element, and the oxygen generation device is adapted to use the molecular sieve element to generate oxygen or oxygen-enriched air from the cabin air. The air generator can be operated with electrical energy, and the air generator is adapted to generate a mass flow of cabin air, so that the cabin air can be provided to the oxygen generation device. As a result, the oxygen generation device can use the molecular sieve principle to generate oxygen or oxygen-enriched air, requiring only electrical energy for this purpose. Further, several molecular sieves can be used, for example, in order to generate oxygen or oxygen-enriched air from the cabin air by means of the pressure-swing-adsorption process (e.g., PSA-pressure swing adsorption and/or VSA-vacuum swing adsorption). Molecular sieves can be natural and synthetic zeolites, which have a strong adsorption capacity for gases, vapors and dissolved substances with specific molecular sizes. Selecting the right molecular sieve makes it possible to separate molecules of varying size, including, but not limited to the oxygen molecules from the cabin air, for example. The pressure-swing-adsorption process (PSA-pressure swing adsorption and/or VSA-vacuum swing adsorption) is a physical process for selectively breaking down gas mixtures (e.g., cabin air) under pressure. Special porous materials (e.g., zeolites, activated carbon) are used as the molecular sieve in order to adsorb molecules based on their kinetic diameter. The pressure-swing-adsorption process makes use of the fact that gases adsorb to varying degrees on surfaces. The gas mixture is introduced into a column under a precisely defined pressure of the cabin air, and the pressure can be prepared by means of the air generator. The molecular sieve now adsorbs the undesired components, and the oxygen streams unimpeded through the column. As soon as the adsorbent is completely loaded, the air generator reduces the pressure, and the column is rinsed. This makes it possible to realize a continuous product gas stream.

In another exemplary embodiment, the air generator is situated upstream along the mass air flow of the oxygen generation device, wherein the air generator is set up to compress the cabin air and provide it to the oxygen generation device. The air generator compresses the cabin air, and provides it to the oxygen generation device, so that the compressed cabin air is pushed through the molecular sieve. The cabin air pressure at the molecular sieve makes it possible to improve oxygen separation from the cabin air. Further, the pressure swing adsorption process (PSA-pressure swing adsorption) can be used to effect oxygen separation, for example.

In another exemplary embodiment, the air generator is situated downstream along the mass air flow of the oxygen generation device. The air generator here creates a vacuum or under-pressure, and the vacuum can be used to generate the air mass flow, and the cabin air can hence be aspired through the molecular sieve. This also makes it possible to generate an air mass flow to provide cabin air to the molecular sieve. The pore density of the molecular sieve hence allows cabin air to be pushed through the molecular sieve, so that oxygen can be more readily separated form the cabin air. This increases the oxygen content concentration in the oxygen-enriched air. Further, the vacuum swing adsorption method (VSA-vacuum swing adsorption) can be used to effect oxygen separation. In addition, generating the air mass flow by means of a vacuum saves energy.

In another exemplary embodiment, the decentralized oxygen supply unit exhibits a control unit, and the control unit is set up to control the decentralized oxygen supply unit. Therefore, the control unit can be used to flexibly set the production of oxygen from the cabin air, since the control unit can activate the oxygen supply system depending on the oxygen demand. As a consequence, the decentralized oxygen supply unit can be activated as required, and the targeted activation of the oxygen supply system makes it possible to save on energy.

In another exemplary embodiment of the invention, the control unit is set up to centrally receive control signals from an activation device, so that the decentralized oxygen supply unit can be activated. For example, control signals can be entered by an individual or automatically via a centrally arranged control console of the activation device. For example, the flight personal can control the oxygen supply system via a central flight attendant panel (FAP). As a consequence, the control units of the oxygen supply system can be activated centrally and oxygen-enriched air can be supplied centrally for all modular cabin units in the aircraft (e.g., the seating elements).

In another exemplary embodiment of the invention, the control unit exhibits a first transmitter and receiver, and the activation device exhibits a second transmitter and receiver, so that the control signals can be wirelessly transmitted. As a result, radio technology can be used to transmit the control signals. This eliminates the need for wiring in order to exchange information, so that the modular cabin unit (e.g., the passenger seats) can be shifted around without any long retrofitting times. In addition to control signals, status information of the decentralized oxygen supply unit can also be transmitted. For example, oxygen content in the air or information about the functional capacity of the decentralized oxygen supply unit can also be transmitted. As a consequence, for example, all necessary status information can be retrieved centrally without having to check each individual oxygen supply unit.

In another exemplary embodiment of the invention, the decentralized oxygen supply unit further exhibits a sensor element. The sensor element is set up to measure the oxygen-enriched air generated by the oxygen generation device. By measuring the oxygen-enriched air with the sensor element, oxygen content or the purity of the oxygen-enriched air can be measured, for example. If due to a defect in the oxygen generation device contaminated oxygen-enriched air is produced, the sensors can detect this immediately. This makes it possible to prevent contaminated oxygen-enriched air from being supplied to the user. In addition, measuring the quality of oxygen-enriched air makes it possible to determine the functional capacity of the oxygen generation device. The control unit can control the decentralized oxygen supply device based on the measured oxygen-enriched air in such a way that the oxygen generation device shuts down automatically given a change in oxygen quality. As a result, the oxygen status can be permanently monitored, and a high quality can be assured.

In another exemplary embodiment, the modular cabin unit exhibits a mask element. The oxygen-enriched air generated by the oxygen generation device can be supplied to the mask element, so that enriched air can be provided. The modular cabin unit can be supplied with oxygen-enriched air generated by the oxygen generation device. The mask element is set up to provide a user with the oxygen-enriched air within reach. Within reach means that the mask element can here be situated close to the user, so that the user can quickly be supplied with the enriched air. As a result, the user can rapidly retrieve the mask element in case of an emergency, and quickly be provided with enriched air via the mask element.

In another exemplary embodiment, the mask element exhibits a mixing chamber. The mixing chamber can be supplied with the cabin air and the oxygen-enriched air generated by the oxygen generation device, so that an oxygen concentration of the oxygen-enriched air can be set. This makes it possible to predetermine the oxygen content in the oxygen-enriched air, so that the user always receives a sufficient amount of oxygen. If the oxygen percentage is too high in the oxygen-enriched air generated by the oxygen generation device, cabin air can be added in the mixing chamber to reestablish the oxygen percentage.

In another exemplary embodiment, the decentralized oxygen supply unit further exhibits a power terminal, and the power terminal is set up to provide electrical power to the decentralized oxygen supply unit. As a result, the decentralized oxygen supply unit can be flexibly connected to any electrical interface in an aircraft via the power terminal, so that only an electrical interface is required when changing the installation site of the oxygen system. This makes it possible to avoid complicated retrofitting operations. The modular cabin unit is hence autonomous from an oxygen supply line, and therefore more flexible. Further, power storage devices, such as batteries, can be used to supply the power for the decentralized oxygen supply unit. As a result, there is no need for an external power terminal, further increasing flexibility.

In another exemplary embodiment, the decentralized oxygen supply unit further exhibits a starter system, so that oxygen-enriched air can be rapidly provided. Given a sudden drop in pressure, it is imperative that oxygen-enriched air be provided quickly. A starter system makes it possible to bridge the time needed to reach the operational point of the oxygen generation device. The starter system here has rapidly activatable oxygen generation devices. For example, the starter system can be selected from the group comprised of electrical oxygen generation systems, gas-powered oxygen generation systems, chemical oxygen generation systems and storage elements. In this way, starter systems can be combined with the oxygen generation device. For example, the starter systems can be chemical oxygen generation devices with sodium chlorate candles, which are only briefly activated for a specific period. Further, a storage element can store the oxygen or oxygen-enriched air generated by the oxygen generation device, and provides it to the oxygen outlet. This makes it possible to produce and store oxygen or oxygen-enriched air, and provide it to the oxygen outlet or mask elements as needed. In an emergency, oxygen-enriched air can thereby be provided, bridging a startup period for the oxygen generation system.

In another exemplary embodiment of this invention, the decentralized oxygen supply unit is incorporated in the modular cabin unit integrally or as a single piece. This makes it possible to reduce the space required for installing the oxygen supply unit in the modular cabin unit, since there is no need for heavy and space-intensive connecting elements.

In another exemplary embodiment, the decentralized oxygen supply unit in the modular cabin unit is established replaceable. As a result, it can be quickly removed and replaced with another oxygen generation device in the event of a defect or when performing maintenance on the oxygen supply unit. This reduces the time required during repair and maintenance, since the changed oxygen supply unit need not be repaired or maintained in the modular cabin unit, but rather can be replaced in the meantime by a functioning modular cabin unit for that time. In addition to the ability to replace the decentralized oxygen supply unit, the modular cabin unit in the aircraft can also be replaceable.

In another exemplary embodiment of the invention, the oxygen supply system exhibits another modular cabin unit. The decentralized oxygen supply device is set up to centrally provide the modular cabin unit and other modular cabin unit with oxygen-enriched air. This makes it possible to supply an entire row of seats with oxygen-enriched air via the decentralized oxygen supply unit, for example, if the modular cabin unit and other modular cabin unit consist of a passenger seating element. For example, one of the three passenger seating elements in a three-seat configuration can exhibit such a decentralized oxygen supply unit, and supply the two other passenger seating elements. The other passenger seating elements here comprise mask modules with mask elements, which receive oxygen-enriched air from the decentralized oxygen supply unit via the oxygen port. This reduces the need for decentralized oxygen supply units, thereby saving on weight and costs.

In another exemplary embodiment of the invention, the modular cabin unit is selected from the group comprised of passenger seats, toilette modules (lavatories), service facilities (galleys), sleeping modules (restrooms), social facilities, service areas and door elements. Therefore, the modular cabin elements can each exhibit a decentralized oxygen supply unit, which only require an electrical terminal for operation. A complex tubing system or chemical oxygen generation systems are here not required. As a result, the modular cabin elements can be flexibly installed at various locations, without having to perform complicated retrofitting operations. Only a power supply must be provided at the installation sites to activate the decentralized oxygen supply units.

The device configurations are also valid for the method and progressive movement means, as well as for usage and vice versa.

BRIEF DESCRIPTION OF THE DRAWINGS

The present invention will hereinafter be described in conjunction with the following drawing figures, wherein the figures are diagrammatic and not to scale and like numerals denote like elements, and.

DETAILED DESCRIPTION

The following detailed description is merely exemplary in nature and is not intended to limit application and uses. Furthermore, there is no intention to be bound by any theory presented in the preceding background and summary or the following detailed description.

Figure 1:
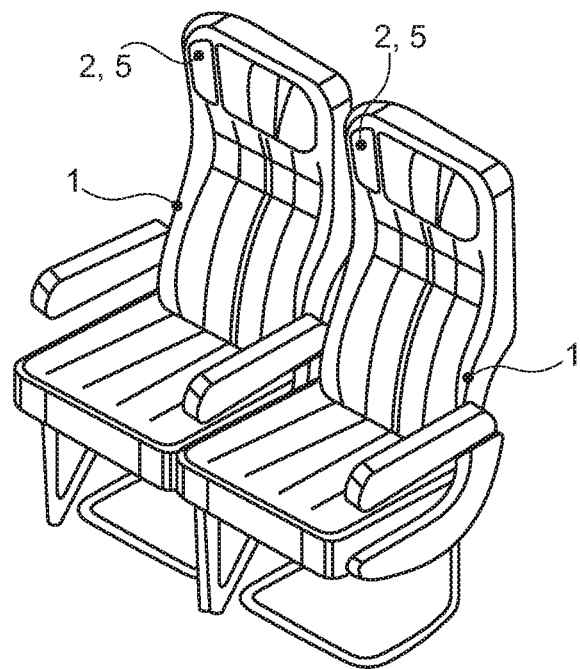
FIG. 1 is a diagrammatic view of a modular cabin unit with an oxygen supply unit according to an exemplary embodiment of this invention.

FIG. 1 shows an exemplary embodiment of the oxygen supply system for generating oxygen-enriched air from cabin air in an aircraft. The oxygen supply system exhibits a modular cabin unit 1 with an oxygen port 7 and a decentralized oxygen supply unit 2 with an oxygen outlet 13. The decentralized oxygen supply unit 2 is situated in the modular cabin unit 1. The decentralized oxygen supply unit 2 is further set up to generate oxygen-enriched air from cabin air via electrical power, wherein the oxygen-enriched air can be provided to the oxygen port 7 of the modular cabin unit 1 via the oxygen outlet 13.

Further, FIG. 1 shows a modular cabin unit 1 comprised of a passenger seating element. The decentralized oxygen supply unit 2 can here be situated in the headrest of the passenger seating element, for example. As a result, the decentralized oxygen supply unit 2 is in direct proximity to the user. In addition, the headrest can incorporate breathing-ready mask elements 5, so that the user can very quickly retrieve these mask elements 5, and hence be provided with oxygen-enriched air. The decentralized oxygen supply unit 2 can further be situated in the backrest, armrest or seat cushion.

Figure 2:
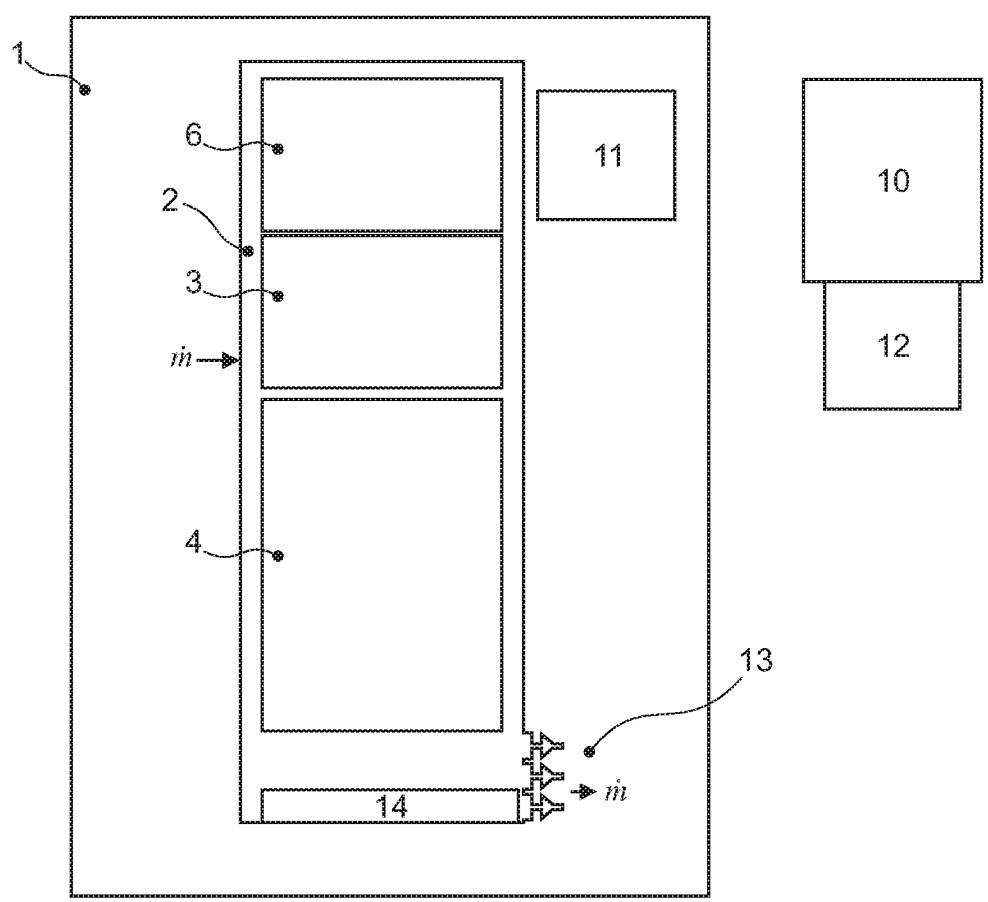
FIG. 2 is a diagrammatic view of an exemplary embodiment of an oxygen supply system with upstream air generator.

FIG. 2 shows an oxygen supply system for generating oxygen from cabin air in an aircraft. The oxygen supply system here exhibits a modular cabin unit 1, on which the decentralized oxygen supply unit 2 is situated. The decentralized oxygen supply unit 2 exhibits an air generator 3 and oxygen generation device 4. The oxygen generation device 4 can here exhibit a molecular sieve element, with which oxygen-enriched air can be generated from the cabin air. The oxygen generation device 4 can instead also exhibit an electrolysis device or electrochemical membrane for generating oxygen. The oxygen generation device 4 can be provided with an air mass flow of cabin air via the air generator 3, which can be operated with electrical power. FIG. 2 here shows an air generator 3 situated in front of the oxygen generation device 4 in terms of the direction of air mass flow, in order to provide the oxygen generation device 4 with compressed cabin air. The generated oxygen-enriched air can be provided to the oxygen port 7 of the modular cabin unit 1 or to the user at the oxygen outlet 13.

The air generator 3 can be operated with electrical power. Hence, the oxygen generation device 4 and the air generator 3 can utilize electrical power to provide the required amount of oxygen-enriched air after only a short time. Further, the system is independent of an external supply except for a power terminal. The oxygen-enriched air does not require a complicated distribution system since the user can be located in direct proximity to the decentralized oxygen supply unit 2.

FIG. 2 also depicts a control unit 6, which can be situated in the decentralized oxygen supply unit 2. This control unit 6 can control the oxygen generation device 4 and air generator 3 in such a way that a required oxygen quantity can always be provided, and the modular cabin unit 1 (e.g., the passenger seating element) can be supplied with enriched air.

The control unit 6 can also be actuated via an activation device 10, so that the decentralized oxygen supply unit 2 can be controlled centrally from a single location. Control signal data transmission can be provided by means of a first transmitter and receiver 11 and a second transmitter and receiver 12, thereby eliminating the need for complicated wiring and cabling.

FIG. 2 also depicts a starter system 14. The startup phase required by the oxygen generation device 4 before being able to generate sufficient oxygen or oxygen-enriched air can be bridged via the starter system 14. As a result, oxygen-enriched air can be quickly provided in case of emergency. The starter system 14 can consist of a storage element filled with oxygen or oxygen-enriched air, for example, which rapidly releases oxygen-enriched air on demand. While the oxygen generation device 4 is operating, the storage element can again be charged with oxygen or oxygen-enriched air. Further, chemical oxygen generation devices can be used as the starter system 14, in which oxygen or oxygen-enriched air is provided via a short chemical reaction. A short activation of chemical oxygen generation devices is sufficient to reach the operational readiness of the oxygen generation device 4, so that high temperatures can be avoided.

Figure 3:
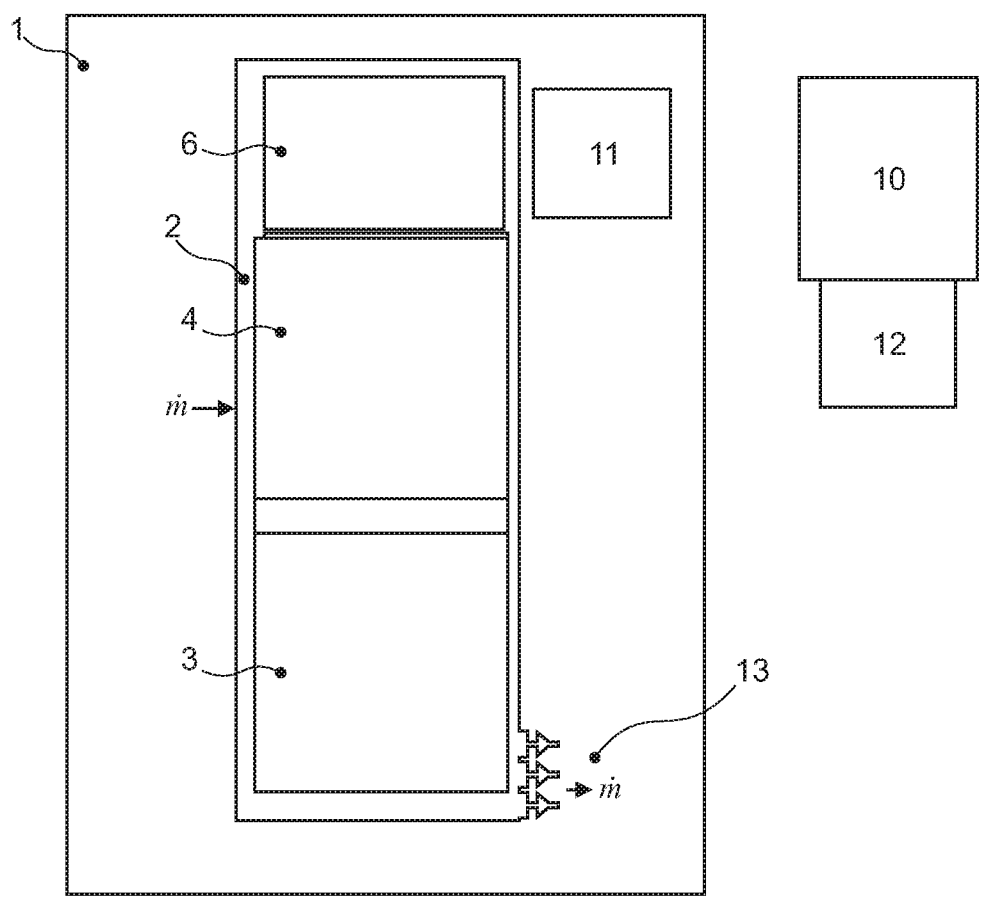
FIG. 3 is a diagrammatic view of an exemplary embodiment of an oxygen supply system with downstream air generator.

FIG. 3 shows an exemplary embodiment in which the air generator 3 is placed downstream from the oxygen generation device 4 viewed along the air mass flow (m). The air generator here generates a vacuum to aspirate the cabin air through the oxygen generation device 4. As a result, this exemplary embodiment shown on FIG. 3 is suitable for generating oxygen or oxygen-enriched air from cabin air by means of the vacuum-swing-adsorption method.

Figure 4:
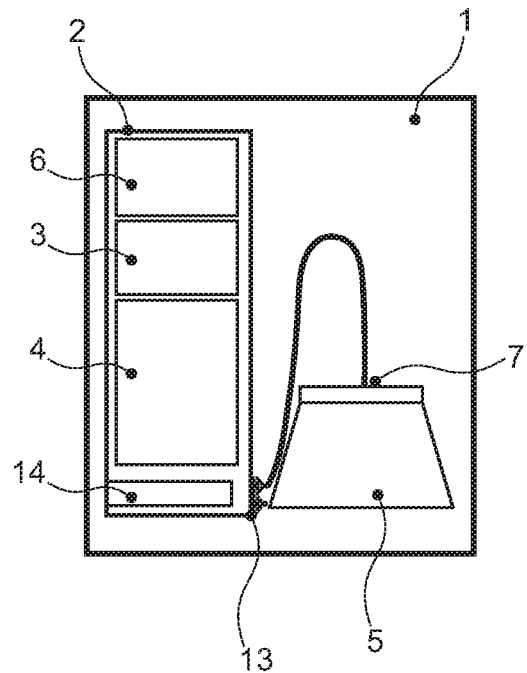
FIG. 4 to 6 are diagrammatic views of an exemplary embodiment of the oxygen supply system with different mask element arrangements.
Figure 5:
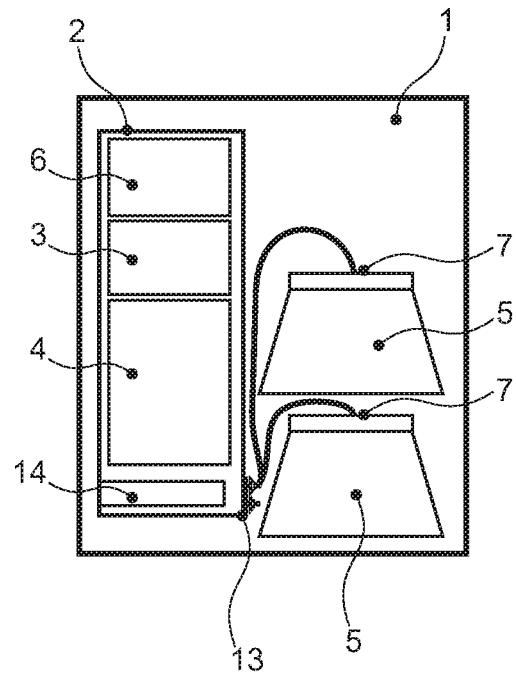
Figure 6:
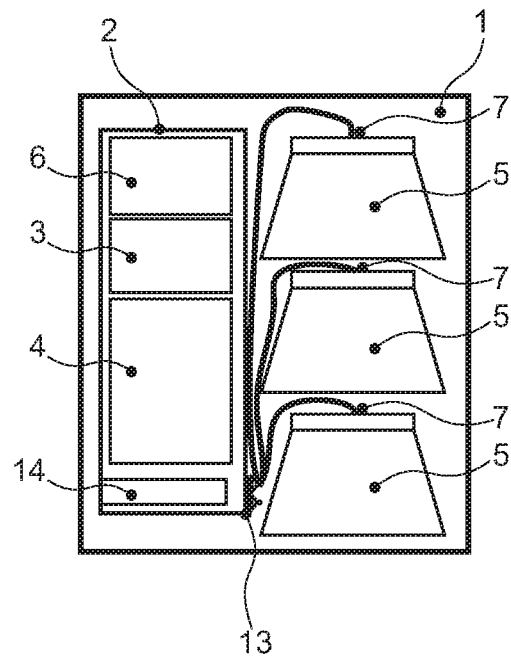

FIG. 4 to FIG. 6 depict a decentralized oxygen supply unit 2, which can supply a mask element 5 or several mask elements 5 with enriched air.

FIG. 4 shows a decentralized oxygen supply unit 2 situated in a modular cabin unit 1. The enriched air can be provided by way of an oxygen outlet 13 to an oxygen port 7 of a mask element 5, which is in direct proximity to the user. The mask element 5 here exhibits a mixing chamber, in which the generated oxygen or oxygen-enriched air mixes with the cabin air, producing a desired oxygen concentration in breathable air. This breathable air can be supplied to the user. Further, FIG. 5 and FIG. 6 show that several mask elements 5 can be arranged on a decentralized oxygen supply unit 2. The oxygen generation device 4 with an oxygen outlet 13 can provide several oxygen ports 7 of the mask elements 5 with oxygen-enriched air. As a result, a plurality of mask elements can be connected with an oxygen generation device 4. FIG. 4 to FIG. 6 also shows storage elements, which can quickly provide oxygen.

Figure 7:
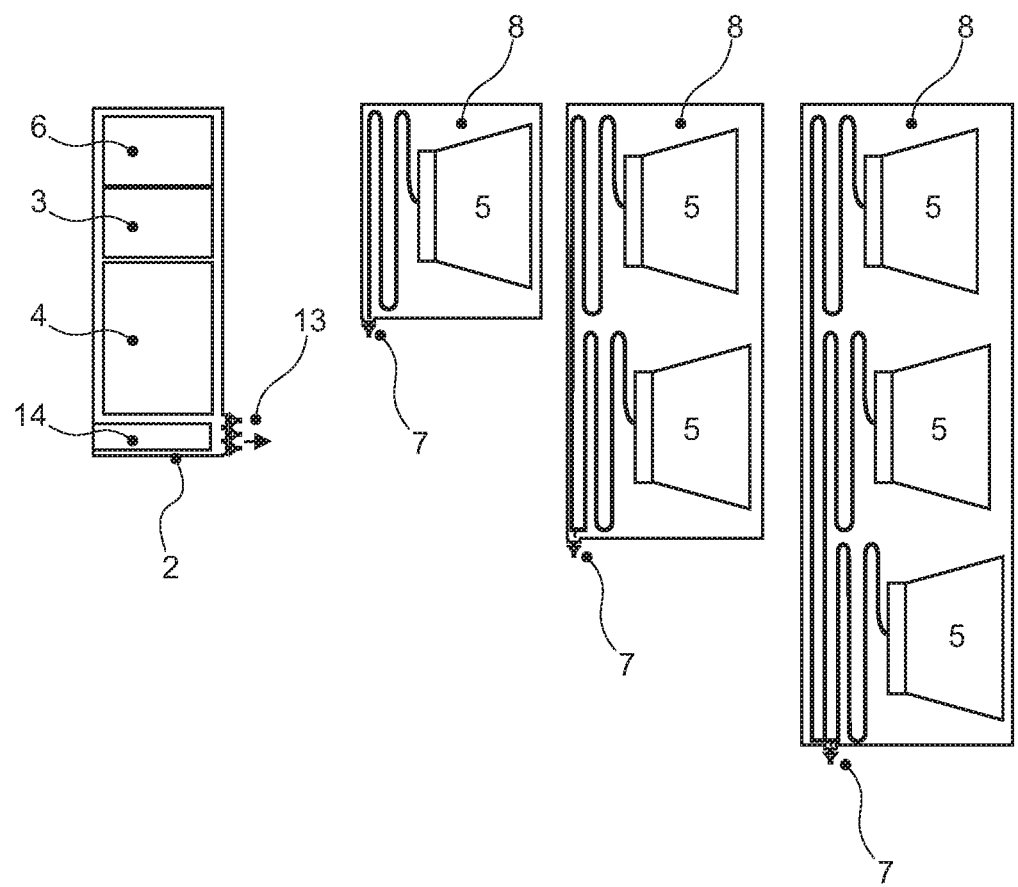
FIG. 7 is a diagrammatic view of an exemplary embodiment of the is invention, in which several mask elements are connected to an oxygen supply unit.

FIG. 7 depicts an additional exemplary arrangement of the decentralized oxygen supply unit 2 and mask modules 8 with mask elements 5. The mask modules 8 can here be situated not in the immediate environment of the decentralized oxygen supply unit 2, but rather must be installed by a connection via oxygen ports 7 at various locations in the modular cabin unit 1 (e.g., the passenger seating element). For example, the decentralized oxygen supply unit 2 can hence be located in, under or next to the modular cabin unit 1, and hence be independent by located of the actual installation site of the mask modules 8. On the other hand, the mask modules 8 can be flexibly arranged at various installation sites without having to retrofit the decentralized oxygen supply unit 2. The modular design of the mask modules 8 allows them to be flexibly arranged with the oxygen port 7 on an oxygen outlet 13 of the decentralized oxygen supply unit 2, and quickly retrofitted.

Figure 8:
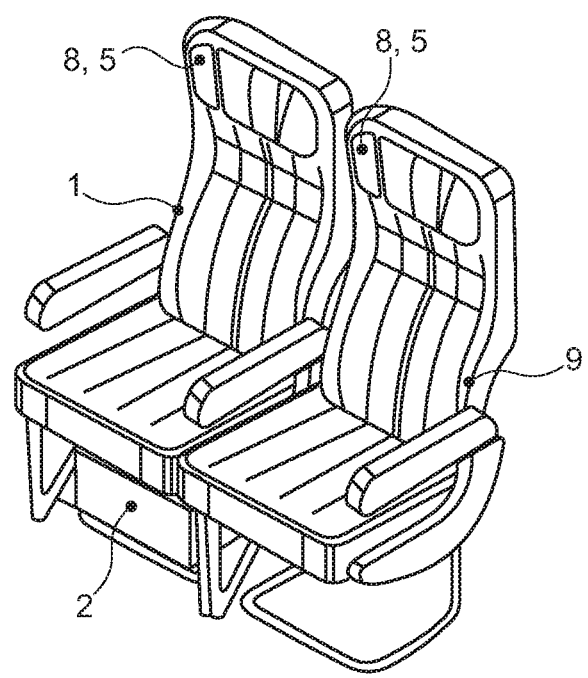
FIG. 8 is a diagrammatic view of a modular cabin unit, in which the mask elements and decentralized oxygen supply unit are installed at different locations, according to an exemplary embodiment of the invention.

FIG. 8 shows another exemplary arrangement of the decentralized oxygen supply unit 2 in a modular cabin unit 1 (e.g., in a passenger seating element). In this case, the decentralized oxygen supply units 2 and the mask modules 8 with mask elements 5 can be arranged at various installation sites in the modular cabin unit 1. For example, the decentralized oxygen supply unit 2 can be situated under a modular cabin unit 1 (e.g., in a passenger seating element) as depicted on FIG. 8, while the mask module 8 with the mask element 5 is situated in the headrest, and hence in direct proximity to the user. In addition, a mask module 8 can be integrated into another modular cabin unit 9 (e.g., in another passenger seating element), and obtain oxygen-enriched air from the decentralized oxygen supply unit 2 of the modular cabin unit 1. As a result, the decentralized oxygen supply unit 2 can here be incorporated into the modular cabin unit 1 at various mounting sites (e.g., in a passenger seating element), which are particularly suited for integration for reasons of space (e.g., under the passenger seating element) while the mask module 8 can be incorporated close to where the user breathes. The user can hence quickly retrieve the mask element 5 of the mask module 8, and immediately be supplied with oxygen-enriched air.

In addition, let it be noted that "comprising" does not preclude any other elements or steps, and "one" or "a" do not preclude a plurality. Further, let it be noted that features or steps that were described with reference to one of the above exemplary embodiments can also be used in combination with other features or steps of other exemplary embodiments described above. Moreover, while at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. An oxygen supply system for generating oxygen-enriched air out of cabin air in an aircraft, comprising:
    a modular cabin unit with an oxygen port, the modular cabin unit selected from the group comprising a toilet module, a service facility and a door element; and
    a decentralized emergency oxygen supply unit with an oxygen outlet, wherein the decentralized emergency oxygen supply unit is set up in the modular cabin unit and includes a sensor element,
    wherein the decentralized emergency oxygen supply unit comprises an oxygen generation device, which is set up to generate oxygen-enriched air from the cabin air via electrical power using an electrolysis process or a molecular sieve after completion of a startup phase and the sensor element measures the oxygen-enriched air generated by the oxygen generation device to detect a contamination of the oxygen-enriched air,
    wherein the decentralized emergency oxygen supply unit further comprises a chemical oxygen generation starter system that quickly provides oxygen-enriched air only until the oxygen generation device has finished the startup phase, and
    wherein the oxygen-enriched air is provided at the oxygen outlet of the modular cabin unit via the oxygen outlet.

2. The oxygen supply system according to claim 1;
    wherein the decentralized emergency oxygen supply unit comprises an air generator;
    wherein the air generator can be operated with the electrical power;
    wherein the air generator is set up to generate a mass flow of cabin air, so that the oxygen generation device can be provided with cabin air; and
    wherein the oxygen generation device is set up to generate oxygen-enriched air from the mass flow of cabin air by means of the molecular sieve element.

3. The oxygen supply system according to claim 2;
    wherein the air generator of the oxygen generation device is situated upstream along the mass flow; and
    wherein the air generator is set up to compress the cabin air and provide it to the oxygen generation device.

4. The oxygen supply system according to claim 2;
    wherein the air generator of the oxygen generation device is situated downstream along the mass flow;

wherein the air generator is set up to generate a vacuum, and wherein the cabin air can be aspirated through the molecular sieve by means of the vacuum.

5. The oxygen supply system according to claim 1;

wherein the decentralized emergency oxygen supply unit comprises a control unit; and wherein the control unit is set up to control the decentralized emergency oxygen supply unit.

6. The oxygen supply system according to claim 5;

wherein the control unit is set up to centrally receive control signals from an activation device, so that the decentralized emergency oxygen supply unit can be activated.

7. The oxygen supply system according to claim 6;

wherein the control unit comprises a first transmitter and receiver; and wherein the activation device comprises a second transmitter and receiver, so that the control signals are wirelessly transmitted.

8. The oxygen supply system according to claim 2;

wherein the modular cabin unit comprises a mask element;

wherein the oxygen-enriched air generated by the oxygen generation device can be supplied to the modular cabin unit; and wherein the mask element is set up to provide a user with the oxygen-enriched air within reach.

9. The oxygen supply system according to claim 8;

wherein the mask element comprises a mixing chamber; and wherein the cabin air and the oxygen-enriched air generated by the oxygen generation device can be supplied to the mixing chamber, making it possible to adjust an oxygen concentration of enriched air.

10. The oxygen supply system according to claim 1;

wherein the decentralized emergency oxygen supply unit further comprises a power terminal; and wherein the power terminal is set up to provide the decentralized emergency oxygen supply unit with electrical power.

11. The oxygen supply system according to claim 1;

wherein the decentralized emergency oxygen supply unit is integrally incorporated in the modular cabin unit.

12. The oxygen supply system according to claim 1;

wherein the decentralized emergency oxygen supply unit is replaceably incorporated in the modular cabin unit.

13. The oxygen supply system according to claim 1;

wherein the modular cabin unit is replaceably incorporated in the aircraft.

14. The oxygen supply system according to claim 1, further comprising:

another modular cabin unit;

wherein the decentralized emergency oxygen supply unit is set up to centrally provide the modular cabin unit and additional modular cabin unit with oxygen-enriched air.

15. A method for generating oxygen-enriched air from cabin air in an aircraft, comprising:

setting up a decentralized emergency oxygen supply unit in a modular cabin unit, the modular cabin unit selected from the group comprising a toilet module, a service facility and a door element;

generating oxygen-enriched air from the cabin air via electrical power using an electrolysis process or a molecular sieve with an oxygen generation device after completion of a startup phase;

quickly providing oxygen-enriched air with a chemical oxygen generation starter system only until the oxygen generation device has finished the startup phase;

measuring the oxygen-enriched air generated by the oxygen generation device with a sensor element associated with the decentralized emergency oxygen supply unit to detect a contamination of the oxygen-enriched air; and providing the oxygen-enriched air to an oxygen port of the modular cabin unit via an oxygen outlet.

\* \* \* \* \*